US010948303B2

(12) United States Patent
Kasahara et al.

(10) Patent No.: US 10,948,303 B2
(45) Date of Patent: Mar. 16, 2021

(54) VEHICLE CONTROL DEVICE

(71) Applicant: HONDA MOTOR CO., LTD., Tokyo (JP)

(72) Inventors: Hirokiyo Kasahara, Wako (JP); Takeru Goto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 254 days.

(21) Appl. No.: 16/166,627

(22) Filed: Oct. 22, 2018

(65) Prior Publication Data

US 2019/0120634 A1 Apr. 25, 2019

(30) Foreign Application Priority Data

Oct. 24, 2017 (JP) .............................. JP2017-205181

(51) Int. Cl.
| | | |
|---|---|---|
| *B60W 40/04* | (2006.01) | |
| *G01C 21/34* | (2006.01) | |
| *G01C 21/28* | (2006.01) | |
| *G01S 17/89* | (2020.01) | |
| *G01S 13/931* | (2020.01) | |
| *G01S 13/86* | (2006.01) | |

(Continued)

(52) U.S. Cl.
CPC .............. *G01C 21/34* (2013.01); *B60W 40/04* (2013.01); *B60W 60/0027* (2020.02);
(Continued)

(58) Field of Classification Search
CPC ......... G01C 21/34; G01C 21/28; G01S 17/86; G01S 17/931; G01S 17/89; G01S 13/931; G01S 13/867; G01S 13/865; G01S 17/00; G01S 19/14; B60Q 1/525; B60Q 5/006; G08G 1/096708; G08G 1/0968; G08G 1/09626; G08G 1/166; G08G 1/163;
(Continued)

(56) References Cited

U.S. PATENT DOCUMENTS

| | | | |
|---|---|---|---|
| 6,223,125 B1 * | 4/2001 | Hall ...................... G08G 1/164 | 701/301 |
| 7,133,767 B2 | 11/2006 | Ogino et al. | |

(Continued)

FOREIGN PATENT DOCUMENTS

| | | |
|---|---|---|
| JP | 2004-118608 A | 4/2004 |
| JP | 2012-226618 A | 11/2012 |
| JP | 2016-009200 A | 1/2016 |

OTHER PUBLICATIONS

Office Action dated Aug. 6, 2019 issued over the corresponding Japanese Patent Application No. 2017-205181 with the English translation thereof.

*Primary Examiner* — Genna M Mott
(74) *Attorney, Agent, or Firm* — Carrier Blackman & Associates, P.C.; Joseph P. Carrier; Jeffrey T. Gedeon

(57) ABSTRACT

A vehicle control device includes a space estimation unit that, in a case where it is recognized that a travel position of a host vehicle is inside a railroad crossing, which is a stop prohibited area, and it is recognized that a side road vehicle intends to enter in front of the host vehicle, on the assumption that the side road vehicle has entered in front of the host vehicle, estimates whether a space enough for the host vehicle is formed between the side road vehicle and the stop prohibited area, and a vehicle controller that, if it is estimated that the space is not formed, causes the host vehicle to perform entry prevention action to prevent the side road vehicle from entering in front of the host vehicle.

8 Claims, 5 Drawing Sheets

(51) Int. Cl.
    *G01S 17/86*     (2020.01)
    *G01S 17/931*     (2020.01)
    *B60W 60/00*     (2020.01)
    *G01S 19/14*     (2010.01)
    *B60W 30/12*     (2020.01)
    *G01S 17/00*     (2020.01)

(52) U.S. Cl.
    CPC ............ *G01C 21/28* (2013.01); *G01S 13/865* (2013.01); *G01S 13/867* (2013.01); *G01S 13/931* (2013.01); *G01S 17/86* (2020.01); *G01S 17/89* (2013.01); *G01S 17/931* (2020.01); *B60W 30/12* (2013.01); *G01S 17/00* (2013.01); *G01S 19/14* (2013.01)

(58) Field of Classification Search
    CPC .. B60W 60/0027; B60W 40/04; B60W 30/12; B60W 30/095
    See application file for complete search history.

(56) References Cited

U.S. PATENT DOCUMENTS

| | | | |
|---|---|---|---|
| 10,140,859 B1* | 11/2018 | Greenberger | G08G 1/096 |
| 2005/0171675 A1* | 8/2005 | Sawamoto | B60K 31/0008 |
| | | | 701/96 |
| 2007/0150196 A1* | 6/2007 | Grimm | B60T 7/22 |
| | | | 701/301 |
| 2016/0055744 A1* | 2/2016 | Branson | G08G 1/0112 |
| | | | 340/916 |
| 2017/0232964 A1* | 8/2017 | Moritani | B60T 7/22 |
| | | | 701/70 |
| 2017/0287331 A1* | 10/2017 | Laur | H04W 84/005 |
| 2017/0301237 A1* | 10/2017 | MacNeille | H04W 68/005 |
| 2018/0011496 A1* | 1/2018 | Fairfield | B60W 30/18163 |
| 2018/0105174 A1* | 4/2018 | Russell | G05D 1/0088 |
| 2019/0051061 A1* | 2/2019 | Battles | G07C 5/008 |
| 2020/0114813 A1* | 4/2020 | Lujan | B60W 10/18 |

\* cited by examiner

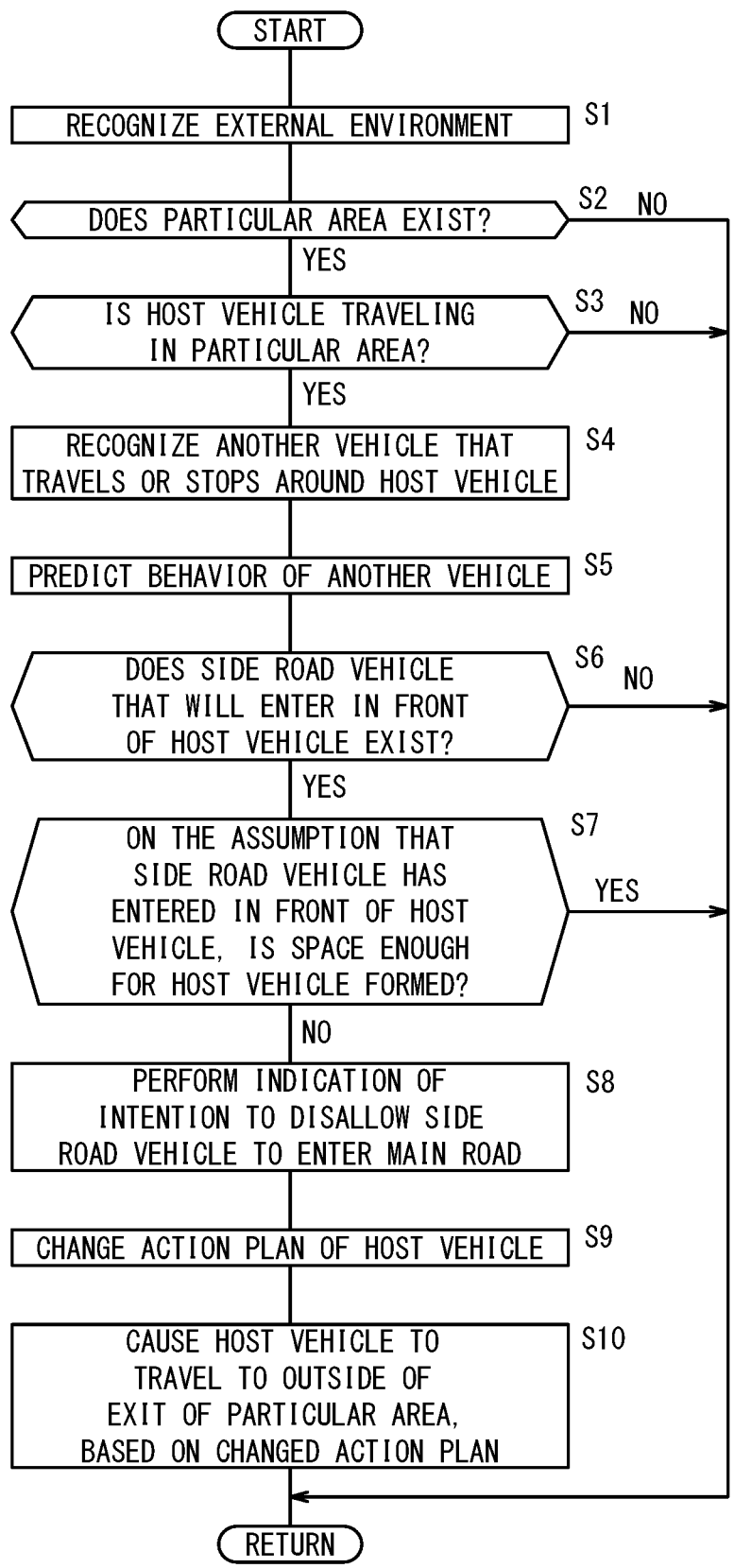

VEHICLE CONTROL DEVICE

CROSS-REFERENCE TO RELATED APPLICATION

This application is based upon and claims the benefit of priority from Japanese Patent Application No. 2017-205181 filed on Oct. 24, 2017, the contents of which are incorporated herein by reference.

BACKGROUND OF THE INVENTION

Field of the Invention

The present invention relates to, for example, a vehicle control device that controls driving (automated driving or driving assistance) of a host vehicle that is traveling on one travel road (hereinafter, referred to as a main road, for convenience), and particularly to a vehicle control device that controls the driving of the host vehicle in a case where the presence of another vehicle is recognized on a side road (hereinafter, including a sideway) that intersects the main road (including a T-junction).

Description of the Related Art

Roads include an area where a passable state and an impassable state are switched, such as a railroad crossing or an intersection with a traffic signal. Such an area is hereinafter referred to as a particular area.

A vehicle that passes through the particular area needs to travel without stopping (staying) in the particular area.

For example, Japanese Laid-Open Patent Publication No. 2012-226618 (hereinafter, referred to as JP2012-226618A) discloses a driving assistance device that performs driving assistance for a vehicle traveling on a main road (hereinafter, referred to as a main road vehicle, for convenience). In this disclosure, the driving assistance is performed for the main road vehicle that intends to pass through (traverse) a railroad crossing where a railroad line and the main road intersect, in front of the railroad crossing.

In a case where a side road along the railroad line exists on the exit side (the other side) of the railroad crossing, the driving assistance device provided on the main road vehicle determines whether there is an entering vehicle that enters from the side road into the main road. If it is determined that the entering vehicle exists that enters from the side road to the main road, the driving assistance device warns and notifies the main road vehicle of the presence of the entering vehicle through a monitor and a buzzer in order to prevent the main road vehicle from entering the railroad crossing zone (paragraphs [0036] and [0037] in JP2012-226618A).

SUMMARY OF THE INVENTION

On the other hand, cases may occur in which, after the main road vehicle starts to enter the railroad crossing in order to pass through the railroad crossing on the main road, another vehicle enters the main road from the side road (hereinafter, the other vehicle is referred to as a side road vehicle, for convenience).

In the case where the side road vehicle enters an intersection area of the main road and the side road before the main road vehicle traveling in the railroad crossing zone exits from the railroad crossing zone as described above, an urgent situation may occur in which the main road vehicle has to stop in the railroad crossing zone.

However, JP2012-226618A does not disclose how to prevent such an urgent situation, and has room for improvement.

The present invention has been made in consideration of such a problem, and an object of the present invention is to provide a vehicle control device that is capable of properly controlling driving (automated driving or driving assistance) of a host vehicle in a case where the presence of another vehicle is recognized in a side road that intersects a main road.

A vehicle control device according to an aspect of the present invention is a vehicle control device configured to perform driving control of a host vehicle, including: an external environment recognition unit configured to recognize an external environment state around the host vehicle; a position recognition unit configured to recognize a travel position of the host vehicle; a space estimation unit configured to, in a case where the position recognition unit recognizes that the travel position of the host vehicle is in a stop prohibited area and the external environment recognition unit recognizes that another vehicle intends to enter in front of the host vehicle, on the assumption that the other vehicle has entered in front of the host vehicle, estimate whether an entry space enough for the host vehicle is formed between the other vehicle and the stop prohibited area; and a vehicle controller configured to, if the space estimation unit estimates that the entry space is not formed, cause the host vehicle to perform entry prevention action to prevent the other vehicle from entering in front of the host vehicle.

With the present invention, in the case where it is recognized that another vehicle intends to enter in front of the host vehicle when the host vehicle is traveling in the stop prohibited area such as a railroad crossing, on the assumption that the other vehicle has entered in front of the host vehicle, it is estimated whether the entry space enough for the host vehicle is formed between the other vehicle and the stop prohibited area. If it is estimated that the entry space is not formed, the entry prevention action to prevent the other vehicle from entering in front of the host vehicle is performed. Thus, it is possible to properly control driving of the host vehicle that is traveling in the stop prohibited area such as the railroad crossing.

In addition, it is preferable that the vehicle controller is configured to notify the other vehicle of the presence of the host vehicle, as the entry prevention action.

With such a structure, since the presence of the host vehicle that is traveling in the railroad crossing or the like is notified to another vehicle, it is possible to prevent another vehicle from entering in front of the host vehicle.

It is preferable that the vehicle controller is configured to operate a sound output device as the entry prevention action to notify the other vehicle of the presence of the host vehicle.

With such a structure, since the sound output device is operated as the entry prevention action to notify another vehicle of the presence of the host vehicle, it is possible to reliably prevent another vehicle from entering in front of the host vehicle.

It is preferable that the vehicle control device further includes an action setting unit configured to determine a travel status of the host vehicle and set action to be taken by the host vehicle, on the basis of recognition results from the external environment recognition unit and the position recognition unit, wherein in a case where the space estimation unit estimates that the entry space is not formed, the action setting unit is configured to change the entry prevention action to be taken by the host vehicle so that the host vehicle moves outside the stop prohibited area more quickly than in the entry prevention action to be taken by the host vehicle that is set before entry of the host vehicle into the stop prohibited area.

With such a structure, since the entry prevention action to be taken by the host vehicle is changed in order to move the host vehicle outside the particular area quickly, by controlling the host vehicle in accordance with the changed entry prevention action, it is possible to prevent another vehicle from entering in front of the host vehicle.

Furthermore, it is preferable that the vehicle controller is configured to accelerate the host vehicle by controlling a driving force output device on the basis of the entry prevention action that has been changed, as the entry prevention action.

With such a structure, since the vehicle controller accelerates the host vehicle, as the entry prevention action, by controlling the driving force output device on the basis of the changed entry prevention action, it is possible to reliably prevent another vehicle from entering in front of the host vehicle.

By the present invention, in the case where it is recognized that another vehicle intends to enter in front of the host vehicle when the host vehicle is traveling in the stop prohibited area such as a railroad crossing, on the assumption that the other vehicle has entered in front of the host vehicle, it is estimated whether the entry space enough for the host vehicle is formed between the other vehicle and the stop prohibited area. If it is estimated that the entry space is not formed, the entry prevention action to prevent the other vehicle from entering in front of the host vehicle is performed. Thus, it is possible to properly control driving of the host vehicle that is traveling in the stop prohibited area such as the railroad crossing.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a plan schematic diagram illustrating a host vehicle that is traveling in a railroad crossing of a main road, and the like;

FIG. 4 is a plan schematic diagram illustrating a host vehicle that is traveling in an intersection of a main road, and the like; and FIG. 5 is a flowchart for describing an operation of the vehicle control device according to the embodiment.

DESCRIPTION OF THE PREFERRED EMBODIMENTS

Figure 1:
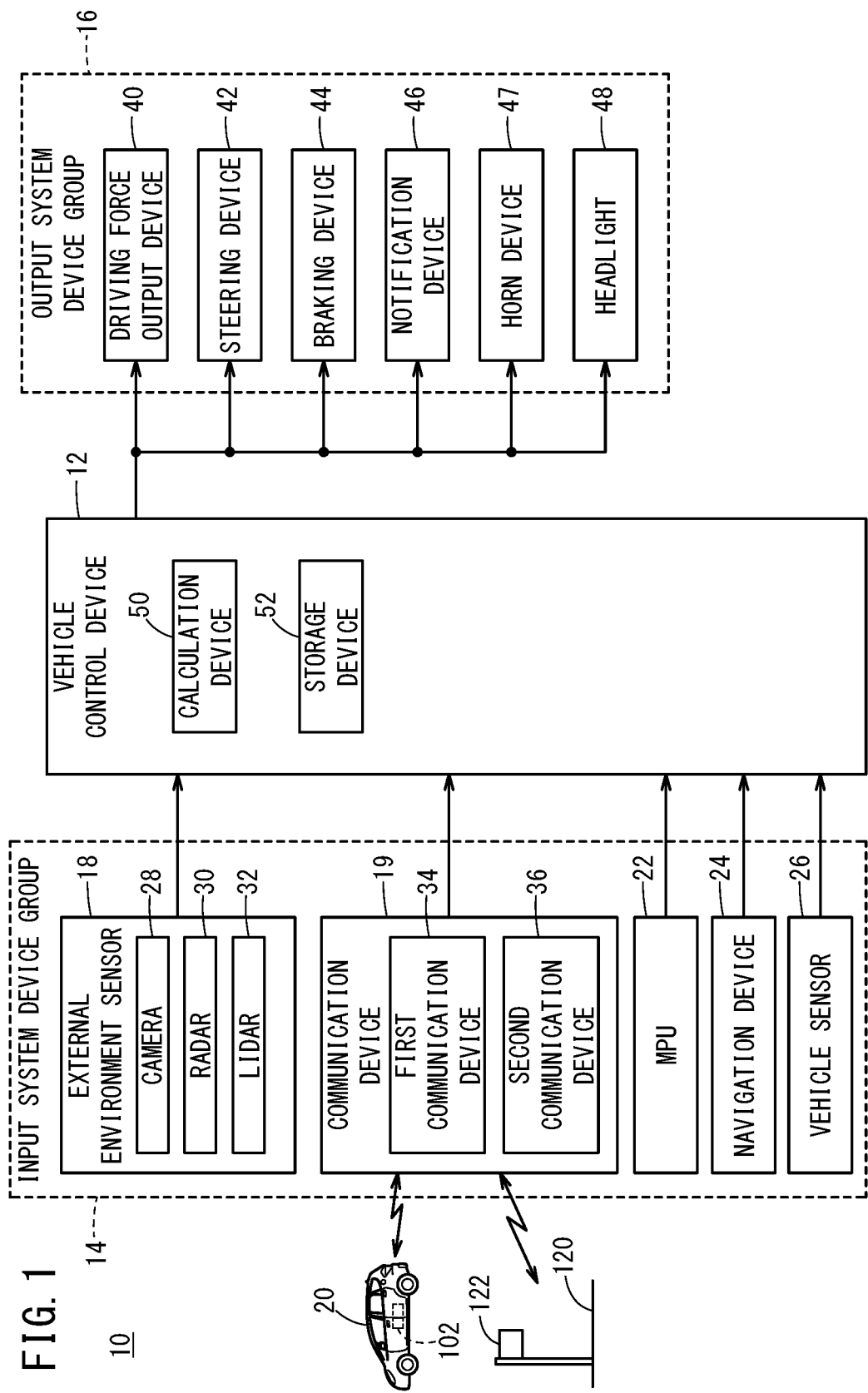
FIG. 1 is a block diagram of a vehicle equipped with a vehicle control device according to an embodiment of the present invention.

A preferred embodiment of a vehicle control device according to the present invention is hereinafter described in detail with reference to the attached drawings. Note that a vehicle corresponding to a subject of description is hereinafter referred to as a driver's own vehicle (which will be also referred to as a host vehicle), and a vehicle other than the host vehicle is referred to as another vehicle. Description is given of a case where vehicles should keep to the left; however, this description is similarly applicable to a case where vehicles should keep to the right. In addition, in the drawings to be described, the same reference symbol may denote the same component or corresponding component.

Regarding other vehicles, another vehicle that travels ahead of the host vehicle in a travel direction is referred to as a preceding vehicle. Unless otherwise indicated, the preceding vehicle is another vehicle that travels right in front of the host vehicle.

In a travel road where the host vehicle is traveling (hereinafter, referred to as a main road), a side road (hereinafter, including a sideway) along a railroad line or a travel road that intersects the main road may exist on an exit side (the other side) of a railroad crossing or an intersection. In this case, another vehicle that intends to enter the main road from the side road while turning left is referred to as a side road vehicle.

Figure 2:
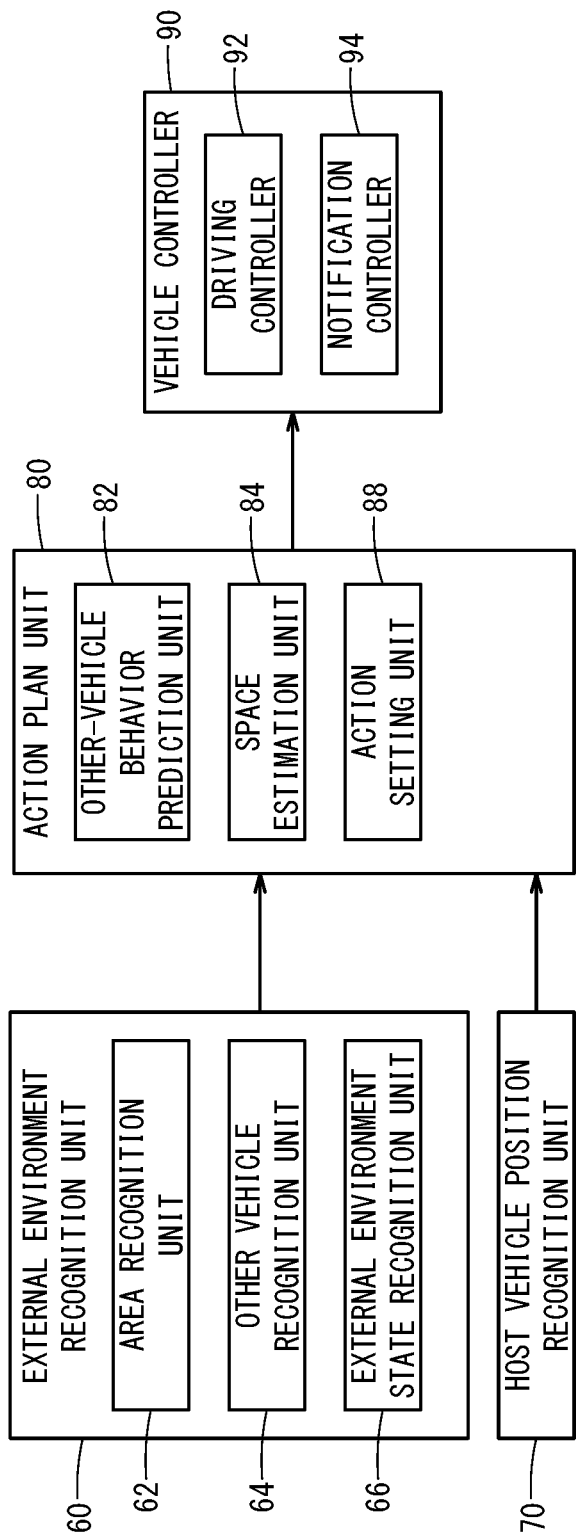
FIG. 2 is a function block diagram of a calculation device illustrated in FIG. 1.
Figure 3:
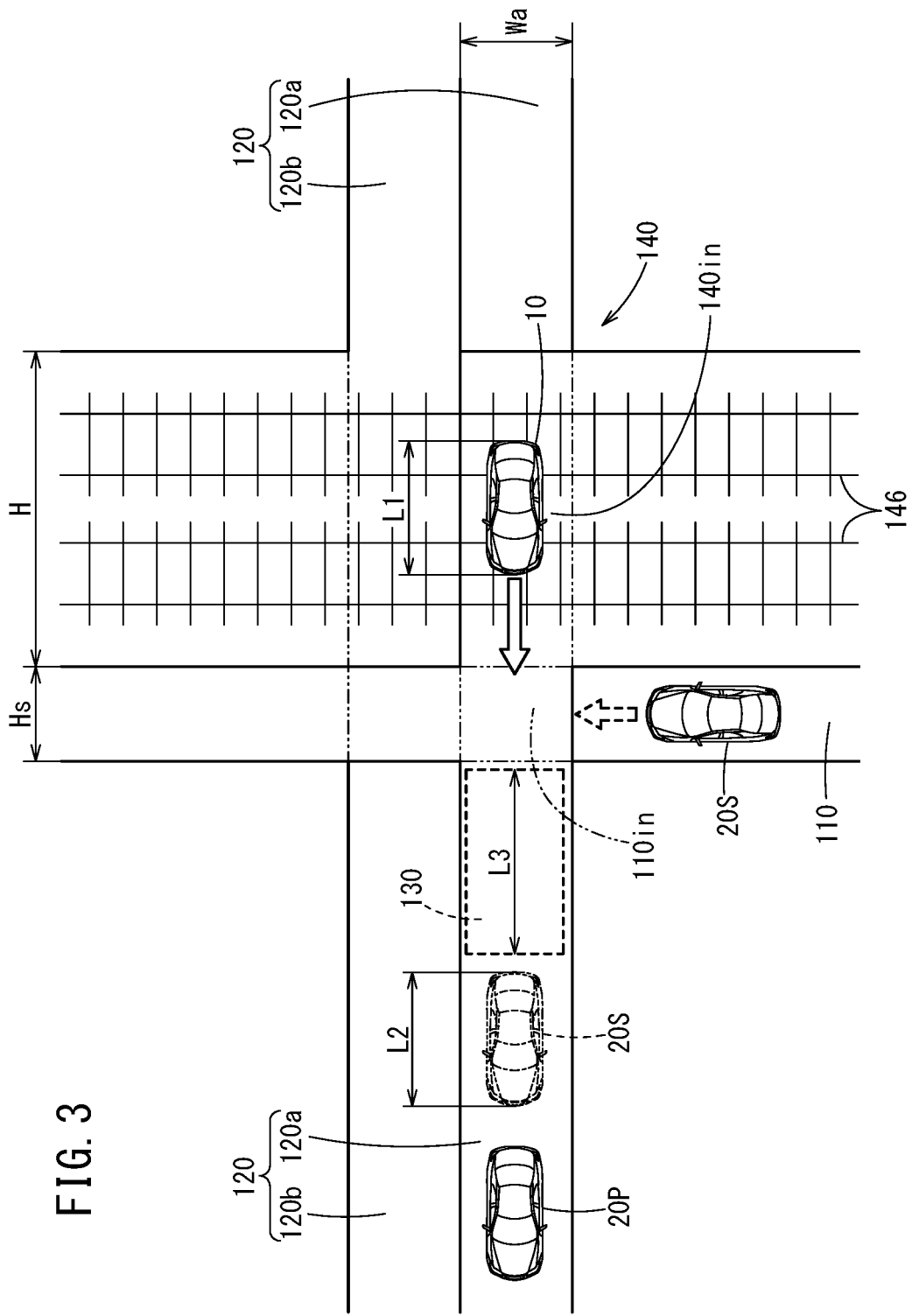
Figure 4:
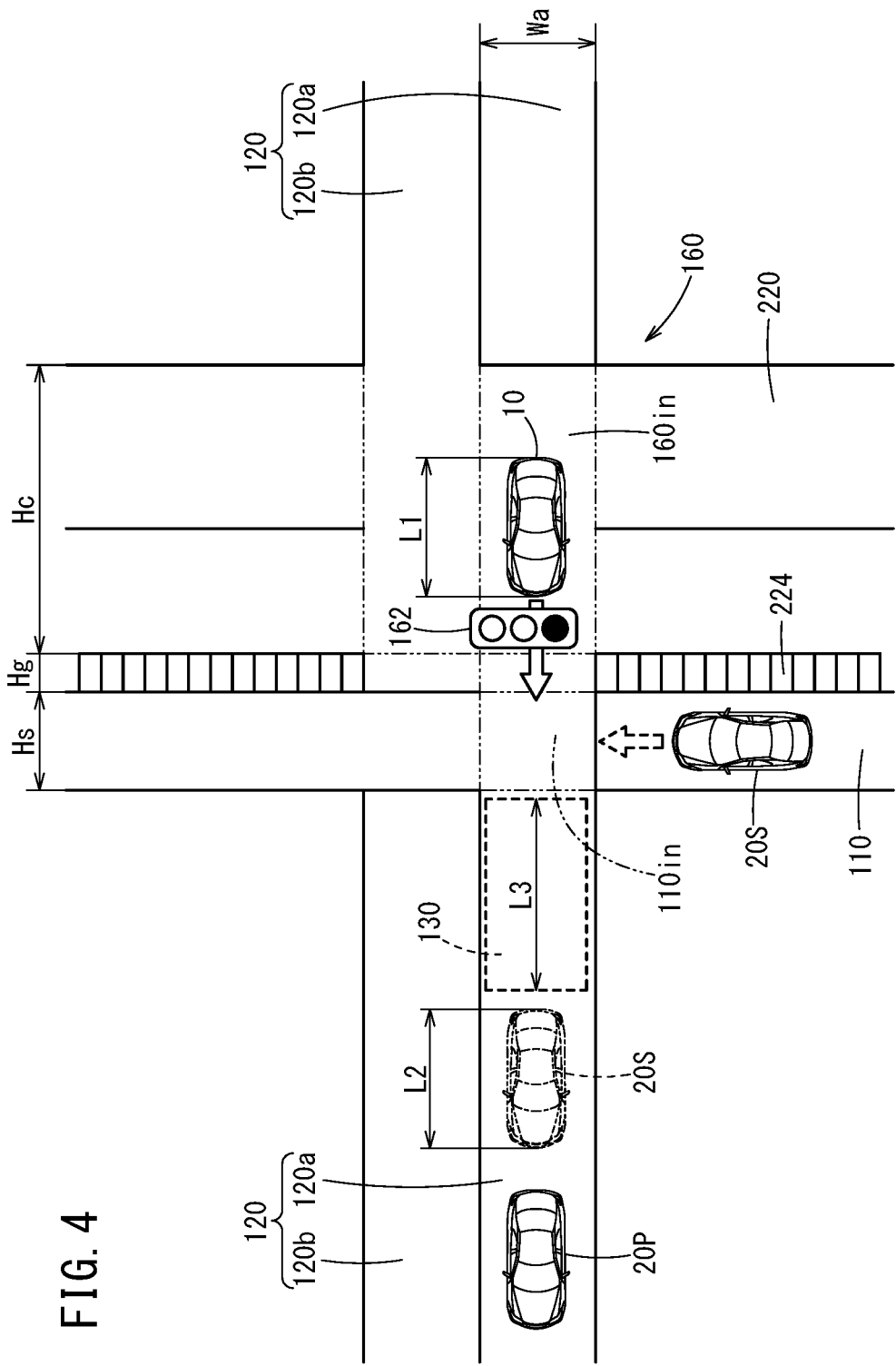

FIG. 1 is a block diagram of a host vehicle 10 including a vehicle control device 12 according to the present embodiment. FIG. 2 is a function block diagram of a calculation device 50. FIG. 3 is a plan schematic diagram illustrating the host vehicle 10 that is traveling on (crossing) a railroad crossing 140 on a main road 120, a side road vehicle 20S that intends to turn left and enter the main road 120 from a side road (sideway) 110 on the exit side of the railroad crossing 140, and the like. FIG. 4 is a plan schematic diagram illustrating the host vehicle 10 that is traveling on an intersection 160 on the main road 120, and the side road vehicle 20S that intends to turn left and enter the main road 120 from the side road (sideway) 110 which lies on the other side of the intersection 160.

1. Structure of Host Vehicle 10

As illustrated in FIG. 1, the host vehicle 10 includes the vehicle control device 12, an input system device group 14 that obtains and stores various information that is input to the vehicle control device 12, and an output system device group 16 that operates in accordance with various commands that are output from the vehicle control device 12. The host vehicle 10 is an automated driving vehicle in which a driving operation is performed by the vehicle control device 12 (including fully automated driving vehicle), or a driving assistance vehicle in which part of the driving operation is assisted.

[1. 1. Input System Device Group 14]

The input system device group 14 includes: an external environment sensor 18 that detects a state of a periphery (external environment) of the host vehicle 10; a communication device 19 that transmits and receives information to and from various communication devices outside the host vehicle 10; an MPU (high-precision map) 22 whose position accuracy is of centimeters or less; a navigation device 24 that generates a travel route to a destination and measures a travel position of the host vehicle 10; and a vehicle sensor 26 that detects a travel state of the host vehicle 10.

The external environment sensor 18 includes one or more cameras 28 that capture images of the external environment, one or more radars 30 and one or more LIDARs (Light Detection and Ranging) 32 that detect the distance and the relative speed between the host vehicle 10 and an object around the host vehicle 10.

The communication device 19 includes a first communication device 34 that performs vehicle-to-vehicle communication with a communication device 102 mounted on another vehicle 20 (a side road vehicle 20S, a preceding vehicle 20P), and a second communication device 36 that performs road-to-vehicle communication with a communication device 122 provided on an infrastructure such as the main road 120.

The navigation device 24 includes a satellite navigation system and a self-contained navigation system.

The vehicle sensor 26 includes a vehicle speed sensor, an acceleration sensor, a yaw rate sensor, an inclination sensor, and the like, which are not shown.

[1. 2. Output System Device Group 16]

The output system device group 16 includes a driving force output device 40, a steering device 42, a braking device 44, a notification device 46, a horn device (klaxon) 47, and a headlight 48.

The driving force output device 40 includes a driving force output electronic control unit (ECU), and a driving source of wheels such as an engine or a driving motor.

The driving force output device 40 generates the driving force to the host vehicle 10 in response to a driver's operation of an accelerator pedal or a driving control command that is output from the vehicle control device 12.

The steering device 42 includes an electric power steering system (EPS) ECU, and an EPS actuator. The steering device 42 generates a steering force to the host vehicle 10 in response to a driver's operation of a steering wheel or a steering control command that is output from the vehicle control device 12.

The braking device 44 includes a braking ECU and a braking actuator. The braking device 44 generates a braking force to the host vehicle 10 in response to a driver's operation of a braking pedal or a braking control command that is output from the vehicle control device 12.

The notification device 46 includes a notification ECU and an information transmission device (such as a display device, an acoustic device, or a tactile device). The notification device 46 gives notice to a driver in response to a notification command that is output from the vehicle control device 12 or another ECU (and also performs assistance operation of driving in a case where the host vehicle 10 is not an automated driving vehicle but a vehicle that needs driving assistance).

[1. 3. Vehicle Control Device 12]

The vehicle control device 12 is made up of the ECUs, and includes a calculation device 50 such as a processor and a storage device 52 such as a ROM or a RAM. The vehicle control device 12 achieves various functions by the calculation device 50 executing programs stored in the storage device 52.

As illustrated in FIG. 2, the calculation device 50 functions as an external environment recognition unit 60, a host vehicle position recognition unit 70, an action plan unit 80, a vehicle controller 90, and the like.

The external environment recognition unit 60 recognizes a situation around the host vehicle 10 and an object such as another vehicle on the basis of the information output from the external environment sensor 18. The external environment recognition unit 60 includes an area recognition unit 62, an other vehicle recognition unit 64, and an external environment state recognition unit 66.

The area recognition unit 62 recognizes the presence, the type, the size, the border position, and the like of a particular area {a railroad crossing 140, an intersection 160, a movable bridge, for example} that is positioned in each of directions (front, left, right, and rear) regarding a travel trajectory of the host vehicle 10 on the basis of image information from the camera 28 and/or the MPU (high-precision map) 22. Note that the particular area may be referred to as a stop prohibited area in the following description.

The other vehicle recognition unit 64 recognizes the presence, the position, the size, and the type of another vehicle 20 (a side road vehicle 20S, a preceding vehicle 20P) that travels or stops around the host vehicle 10, and moreover recognizes the distance and the relative speed between the host vehicle 10 and another vehicle 20 (a side road vehicle 20S, a preceding vehicle 20P) on the basis of the image information from the camera 28 and/or detection information from the radar 30 and the LIDAR 32.

The external environment state recognition unit 66 recognizes overall road environment such as a road shape, a road width, a position of a lane mark, the number of lanes, a lane width, a traffic sign, a lightning state of a traffic signal, an open/close state of a crossing gate on the basis of the image information from the camera 28.

Note that the road shape, the road width, the position of the lane mark, the number of lanes, the lane width, and the traffic sign may be recognized by using the MPU (high-precision map) 22.

The host vehicle position recognition unit 70 recognizes the travel position of the host vehicle 10 and map information around the travel position on the basis of the information output from the navigation device 24 and the MPU 22.

The action plan unit 80 determines a travel situation of the host vehicle 10 on the basis of recognition results from the external environment recognition unit 60 and the host vehicle position recognition unit 70, and sets action of the host vehicle 10 (such as creating a trajectory). The action plan unit 80 includes an other-vehicle behavior prediction unit 82, a space estimation unit 84, and an action setting unit 88.

The other-vehicle behavior prediction unit 82 predicts behavior of another vehicle 20 (a side road vehicle 20S, a preceding vehicle 20P) on the basis of recognition result from the other vehicle recognition unit 64. The prediction of the behavior of another vehicle 20 (a side road vehicle 20S, a preceding vehicle 20P) performed by the other-vehicle behavior prediction unit 82 includes a prediction as to whether the side road vehicle 20S enters in front of the host vehicle 10.

The space estimation unit 84 performs the following estimation on the basis of the recognition result from the external environment recognition unit 60 and the prediction result from the other-vehicle behavior prediction unit 82. Specifically, on the assumption that the side road vehicle 20S has entered in front of the host vehicle 10, the space estimation unit 84 estimates whether a space (empty space) 130 with a length L3 enough for the host vehicle 10 having an entire length L1 is formed ahead of an area 110in where the main road 120 and the side road 110 intersect (hereinafter, referred to as an intersection area), on the main road 120 (i.e., whether such an empty space is formed on a side where a preceding vehicle 20P exists). In this embodiment, the space 130 corresponds to a space having a length obtained by adding a little allowance to the length of a vehicle (the entire length L1 of host vehicle 10).

Specifically, the space estimation unit 84 performs the following estimation in a case where the host vehicle position recognition unit 70 recognizes that the travel position of the host vehicle 10 is in the particular area {railroad crossing zone 140in (FIG. 3), intersection zone 160in (FIG. 4)} and it is recognized that the side road vehicle 20S intends to enter in front of the host vehicle 10 on the basis of the recognition result from the other vehicle recognition unit 64 and the prediction result from the other-vehicle behavior prediction unit 82. More specifically, on the assumption that the side road vehicle 20S with an entire length L2 has entered in front of the host vehicle 10 (and further traveled forward to catch up with the preceding vehicle P), the space estimation unit 84 estimates whether the space 130 where the host vehicle 10 can enter (i.e., enough space for the host vehicle 10) is formed between the assumed side road vehicle 20S on the main road 120 (shown by dashed line in FIG. 3 and FIG. 4) and the intersection area 110in.

Note that, as illustrated in FIG. 3, the railroad crossing zone 140in for the host vehicle 10 corresponds to an area with an approximately rectangular shape on the main road 120 (including an own lane 120a and an opposite lane 120b opposed to own lane 120a), which is formed by a width of the own lane 120a (own lane width Wa) and a railroad crossing length H. However, the railroad crossing zone 140in may be extended to an area that, in addition to the above approximately rectangular shape, further contains the intersection area 110in formed by a side road width Hs for the side road vehicle 20S and the own lane width Wa.

On the other hand, as illustrated in FIG. 4, the intersection zone 160in for the host vehicle 10 corresponds to an area with a substantially rectangular shape that is formed by the own lane width Wa and an intersection length Hc (width of an intersection road 220 that intersects the main road 120). However, the intersection zone 160in may be extended to an area that, in addition to the above substantially rectangular shape, further contains the intersection area 110in substantially formed by the own lane width Wa and a length obtained by adding the width of a side ditch 224 (a side ditch width Hg) to the side road width Hs. Note that the side ditch width Hg is shorter than the entire length L1 of the host vehicle 10.

The action setting unit 88 selects action to be taken by the host vehicle 10 on the basis of the recognition results from the external environment recognition unit 60 and the host vehicle position recognition unit 70, the prediction result from the other-vehicle behavior prediction unit 82, and the estimation result from the space estimation unit 84. On the assumption that the side road vehicle 20S has entered in front of the host vehicle 10, if it is estimated that the space 130 enough for the host vehicle 10 is not formed between the side road vehicle 20S on the main road 120 (shown by dashed line in FIG. 3 and FIG. 4) and the intersection area 110in, the travel trajectory that is targeted by the host vehicle 10 (that is a target travel trajectory and includes a stop position) and a vehicle speed that is targeted by the host vehicle 10 (a target vehicle speed) are set (changed).

The vehicle controller 90 instructs the output system device group 16 to operate on the basis of determination result from the action plan unit 80.

The vehicle controller 90 includes a driving controller 92 and a notification controller 94.

The driving controller 92 generates a control command in accordance with the target travel trajectory and the target vehicle speed set by the action plan unit 80, and outputs the control command to the driving force output device 40, the steering device 42, and the braking device 44.

The notification controller 94 generates a notification command for the driver and outputs the notification command to the notification device 46. Further, the notification controller 94 generates a notification command for the side road vehicle 20S. In this embodiment, the notification command for the side road vehicle 20S corresponds to a sounding command for a sound output device such as the horn device 47, which is output to the horn device 47.

2. Operation of Vehicle Control Device 12

Description is given of an operation (process) of the vehicle control device 12 of the host vehicle 10 traveling in the railroad crossing zone 140in or the intersection zone 160in with reference to a flowchart in FIG. 5. This process is repeatedly performed during an ON state of a power source of the host vehicle 10.

In step S1, the external environment recognition unit 60 recognizes the external environment by latest information output from the input system device group 14 being input thereto.

In step S2, the area recognition unit 62 recognizes the areas on a front side, a left side, a right side, and a rear side of the host vehicle 10. If the area recognition unit 62 recognizes facilities or structural objects unique to the particular area, e.g., the railroad crossing 140 or the intersection 160 here, the area recognition unit 62 recognizes the presence of the particular area (stop prohibited area).

For example, by recognizing the crossing gate or a railroad line 146, the area recognition unit 62 recognizes the presence of the railroad crossing 140, and by recognizing a traffic signal 162 or the intersection road 220 ahead of the host vehicle 10, the area recognition unit 62 recognizes the presence of the intersection 160.

If the particular area exists (step S2: YES), the process proceeds to step S3. On the other hand, if the particular area does not exist (step S2: NO), the process is temporarily ended, and waits until the next cycle.

After the process transitions from step S2 to step S3, the host vehicle position recognition unit 70 recognizes the travel position of the host vehicle 10 and map information around the travel position on the basis of the information output from the navigation device 24 and the MPU 22 in step S3. Then, it is recognized whether the travel position of the host vehicle 10 is in the particular area (railroad crossing zone 140in or intersection zone 160in) on the basis of the travel position of the host vehicle 10 and the information that is output from the area recognition unit 62.

If the travel position of the host vehicle 10 is in the particular area (step S3: YES), the process proceeds to step S4. On the other hand, if the travel position of the host vehicle 10 is not in the particular area (step S3: NO), the process is temporarily ended and waits until the next cycle.

After the process proceeds from step S3 to step S4, the other vehicle recognition unit 64 recognizes the presence, the position, the size, and the type of another vehicle 20 (side road vehicle 20S, preceding vehicle 20P) that travels or stops around the host vehicle 10, and moreover recognizes the distance and the relative speed between the host vehicle 10 and another vehicle 20 (side road vehicle 20S, preceding vehicle 20P) on the basis of the image information from the camera 28 and/or the detection information from the radar 30 and the LIDAR 32 in step S4.

Next, in step S5, the other-vehicle behavior prediction unit 82 predicts behavior of another vehicle 20 (side road vehicle 20S, preceding vehicle 20P) on the basis of the recognition result from the other vehicle recognition unit 64.

Next, in step S6, the other-vehicle behavior prediction unit 82 predicts whether there is a side road vehicle 20S that will enter in front of the host vehicle 10. If it is predicted that the side road vehicle 20S exists that will enter in front of the host vehicle 10 (step S6: YES), the process proceeds to step S7. On the other hand, if it is not predicted that there is a side road vehicle 20S that will enter in front of the host vehicle 10 (step S6: NO), the process is temporarily ended and waits until the next cycle.

Next, in step S7, on the assumption that the side road vehicle 20S has entered in front of the host vehicle 10, the space estimation unit 84 estimates whether there is formed a space 130 where the host vehicle 10 can enter (i.e., a space enough for the host vehicle) is formed between the assumed side road vehicle 20S on the main road 120 (shown by dashed line in FIG. 3 and FIG. 4) and the intersection area 110in, on the basis of the recognition result from the external environment recognition unit 60 and the prediction result from the other-vehicle behavior prediction unit 82.

In the determination in step S7, if the length L3 of the space between the assumed side road vehicle 20S on the main road 120 and the intersection area 110in is longer than the length obtained by adding a little allowance to the entire length L1 of the host vehicle 10, it is estimated that the space 130 enough for the host vehicle 10 is formed. If the length L3 is shorter than the length obtained by adding a little allowance to the entire length L1 of the host vehicle 10, it is estimated that the space 130 enough for the host vehicle 10 is not formed.

If it is estimated that the space 130 enough for the host vehicle 10 is not formed between the side road vehicle 20S and the intersection area 110in (step S7: NO), the process proceeds to step S8. On the other hand, if it is estimated that the space 130 enough for the host vehicle 10 is formed between the side road vehicle 20S and the intersection area 110in (step S7: YES), the process is temporarily ended and waits until the next cycle.

Next, in step S8, the action setting unit 88 sets entry prevention action for preventing entry of the side road vehicle 20S, on the basis of the recognition results from the external environment recognition unit 60 and the host vehicle position recognition unit 70, the prediction result from the other-vehicle behavior prediction unit 82, and the estimation result from the space estimation unit 84. Then, the vehicle controller 90 performs indication of intention to disallow the side road vehicle 20S to enter the main road 120, as the entry prevention action.

The indication of intention to disallow the side road vehicle 20S to enter the main road is to notify the side road vehicle 20S of the presence of the host vehicle 10. In this embodiment, the indication of intention corresponds to the sounding command to the horn device 47. The horn device 47 sounds an alarm continuously on the basis of the sounding command. However, the alarm may be sounded intermittently.

Note that the output destination of the sounding command is not limited to the horn device 47. The output destination may be another sound output device than the horn device 47 as long as it can output a sound to the side road vehicle 20S and notify the side road vehicle 20S that there is a possibility that an urgent situation may occur in which the host vehicle 10 is forced to stop in the railroad crossing zone 140in. In addition, in order to more reliably notify the side road vehicle 20S of the intention to disallow the side road vehicle 20S to enter the main road 120, a blinking command for causing the headlight 48 to blink may be output concurrently (synchronously) with the sounding of the horn device 47.

Furthermore, if the vehicle-to-vehicle communication with the side road vehicle 20S can be performed, the vehicle controller 90 may output a transmitting command for transmitting vehicle information (current position, vehicle speed, target position, estimated arrival time after passing through the particular area, etc.) of the host vehicle 10, to the first communication device 34 that performs the vehicle-vehicle communication with the side road vehicle 20S, concurrently with or instead of the sounding command of the horn device 47.

After the indication of intention is performed in step S8, the process proceeds to step S9. In step S9, the action setting unit 88 changes the travel trajectory targeted by the host vehicle 10 (i.e., the target travel trajectory including the stop position) and the vehicle speed targeted by the host vehicle 10 (the target vehicle speed) that were set before step S9, and sets a new target travel trajectory and a new target vehicle speed on the basis of the recognition results from the external environment recognition unit 60 and the host vehicle position recognition unit 70, the prediction result from the other-vehicle behavior prediction unit 82, and the estimation result from the space estimation unit 84.

The new target travel trajectory and target vehicle speed (hereinafter, collectively referred to as an action plan) after the changing correspond to, for example, an action plan in which the host vehicle 10 passes through the particular area (the host vehicle 10 is moved ahead in the main road 120, and outside the railroad crossing zone 140in or the intersection zone 160in) more quickly than in the previous action plan, which is an action plan set before the host vehicle 10 enters the particular area such as the railroad crossing 140. In the action plan set in this embodiment, the target vehicle speed is changed to accelerate the host vehicle 10 while keeping high torque, such as a low gear selected when the host vehicle 10 has entered the particular area such as the railroad crossing 140.

After the action plan is changed in step S9, the process proceeds to step S10. In step S10, the vehicle controller 90 drives the output system device group 16 including the driving force output device 40 on the basis of the new action plan after the changing, and causes the host vehicle 10 to travel ahead in the main road 120 and outside the railroad crossing zone 140in and the intersection zone 160in.

In the description of the process of the vehicle control device 12 according to the above embodiment, only the railroad crossing 140 and the intersection 160 are recognized as the particular area. However, as the particular area, a movable bridge may be recognized, for example.

3. Summary of the Present Embodiment

The vehicle control device 12 configured to perform driving control of the host vehicle 10 includes: the external environment recognition unit 60 configured to recognize the external environment state around the host vehicle 10; the host vehicle position recognition unit 70 configured to recognize the travel position of the host vehicle 10; the space estimation unit 84 configured to, in the case where the host vehicle position recognition unit 70 recognizes that the travel position of the host vehicle 10 is inside the railroad crossing 140 or the intersection 160, which is the particular area (stop prohibited area), and the external environment recognition unit 60 recognizes that the side road vehicle 20S (another vehicle 20) intends to enter in front of the host vehicle 10, on the assumption that the side road vehicle 20S has entered in front of the host vehicle 10, estimate whether the space 130 (entry space) where the host vehicle 10 can enter (i.e., the space 130 enough for the host vehicle 10) is formed between the side road vehicle 20S and the particular area; and the vehicle controller 90 configured to, if the space estimation unit 84 estimates that the space 130 is not formed, cause the host vehicle 10 to perform the entry prevention action to prevent the side road vehicle 20S from entering in front of the host vehicle 10.

With this structure, in the case where it is recognized that the side road vehicle 20S (another vehicle 20) intends to enter in front of the host vehicle 10 when the host vehicle 10 is traveling in the particular area (stop prohibited area) such as the railroad crossing 140, on the assumption that the side road vehicle 20S has entered in front of the host vehicle 10, it is estimated whether the space 130 (entry space) enough for the host vehicle 10 is formed between the side road vehicle 20S and the particular area. If it is estimated that the space 130 is not formed, the entry prevention action to prevent the side road vehicle 20S from entering in front of the host vehicle 10 is performed. Thus, it is possible to reduce the possibility that a situation may occur in which the host vehicle 10 that is traveling in the railroad crossing 140 or the like has to stop in the particular area such as the railroad crossing 140, so that driving of the host vehicle 10 that is traveling in the particular area such as the railroad crossing 140 can be properly controlled.

In addition, the vehicle controller 90 should preferably notify the side road vehicle 20S of the presence of the host vehicle 10, as the entry prevention action.

With such a structure, since the presence of the host vehicle 10 that is traveling in the railroad crossing 140 or the like is notified to the side road vehicle 20S, it is possible to prevent the side road vehicle 20S from entering in front of the host vehicle 10.

Furthermore, the vehicle controller 90 may operate the horn device 47 (sound output device) as the entry prevention action to notify the side road vehicle 20S of the presence of the host vehicle 10.

With such a structure, since the horn device 47 (sound output device) is operated as the entry prevention action to notify the side road vehicle 20S of the presence of the host vehicle 10, it is possible to reliably prevent the side road vehicle 20S from entering in front of the host vehicle 10.

It is preferable that the vehicle control device further includes the action setting unit 88 configured to determine the travel status of the host vehicle 10 and set the action to be taken by the host vehicle 10 (such as the target travel trajectory, the target vehicle speed, etc.), on the basis of the recognition results from the external environment recognition unit 60 and the host vehicle position recognition unit 70, wherein in the case where the space estimation unit 84 estimates that the space 130 is not formed, the action setting unit 88 is configured to change the entry prevention action to be taken by the host vehicle 10 such that the host vehicle 10 can move outside the particular area more quickly than in the entry prevention action to be taken by the host vehicle 10 that is set before the host vehicle 10 enters the particular area.

With such a structure, since the entry prevention action to be taken by the host vehicle 10 is changed in order to move the host vehicle 10 outside the particular area quickly, by controlling the host vehicle 10 in accordance with the changed entry prevention action, it is possible to prevent the side road vehicle 20S from entering in front of the host vehicle 10.

Furthermore, the vehicle controller 90 may accelerate the host vehicle 10 by controlling the driving force output device 40, on the basis of the entry prevention action that has been changed, as the entry prevention action.

With such a structure, since the vehicle controller 90 accelerates the host vehicle 10, as the entry prevention action, by controlling the driving force output device 40 on the basis of the changed entry prevention action, it is possible to reliably prevent the side road vehicle 20S from entering in front of the host vehicle 10.

Note that the entry prevention action for preventing entry of the side road vehicle 20S is not limited to sounding of the horn device 47, blinking of the headlight 48, acceleration of the host vehicle 10, or the like, and may be any other action as long as it can prevent the side road vehicle 20S from entering the main road 120. For example, if the vehicle-to-vehicle communication with the side road vehicle 20S can be performed, the vehicle controller 90 may instruct the first communication device 34 for performing vehicle-to-vehicle communication with the side road vehicle 20S, to transmit the vehicle information (current position, vehicle speed, target position or estimated arrival time after passing through the particular area, etc.) of the host vehicle 10.

The vehicle control device according to the present invention is not limited to the above embodiment, and can employ various structures without departing from the scope of the present invention.

What is claimed is:

1. A vehicle control device configured to perform driving control of a host vehicle, comprising one or more processors, a storage device, and a vehicle controller, the storage device storing programs to cause the processor to:
   recognize an external environment state around the host vehicle based on information output from an external environment sensor including a camera;
   recognize a travel position of the host vehicle;
   in a case where the one or more processors recognize that the travel position of the host vehicle is in a stop prohibited area and that another vehicle on a side road adjacent to the stop prohibited area and intersecting a road on which the host vehicle is traveling intends to enter in front of the host vehicle, on an assumption that the other vehicle has entered in front of the host vehicle, estimate whether an entry space enough for the host vehicle is formed between the other vehicle and the stop prohibited area using an entire length of the other vehicle determined based on image information acquired by the camera; and
   the vehicle controller, if the one or more processors estimate that the entry space is not formed, causes the host vehicle to perform entry prevention action to prevent the other vehicle from entering in front of the host vehicle.

2. The vehicle control device according to claim 1, wherein the vehicle controller is configured to notify the other vehicle of presence of the host vehicle, as the entry prevention action.

3. The vehicle control device according to claim 2, wherein the vehicle controller is configured to operate a sound output device as the entry prevention action to notify the other vehicle of the presence of the host vehicle.

4. The vehicle control device according to claim 3, wherein the sound output device is a horn device.

5. The vehicle control device according to claim 2, wherein the vehicle controller is configured to cause a headlight to blink as the entry prevention action to notify the other vehicle of the presence of the host vehicle.

6. The vehicle control device according to claim 1, wherein the storage device stores programs to cause the processors to: determine a travel status of the host vehicle and set action to be taken by the host vehicle, and
   in a case where the one or more processors estimate that the entry space is not formed, change the entry prevention action to be taken by the host vehicle so that the host vehicle moves outside the stop prohibited area more quickly than in the entry prevention action to be taken by the host vehicle that is set before entry of the host vehicle into the stop prohibited area.

7. The vehicle control device according to claim 6, wherein the vehicle controller is configured to, as the entry prevention action, accelerate the host vehicle by controlling a driving force output device, based on the entry prevention action that has been changed.

8. The vehicle control device according to claim 1, wherein the stop prohibited area is a railroad crossing.

* * * * *